United States Patent [19]

Faley

[11] Patent Number: 5,077,652
[45] Date of Patent: Dec. 31, 1991

[54] DUAL FEEDBACK LOOP DC-TO-AC CONVERTER

[75] Inventor: Brian J. Faley, Seattle, Wash.

[73] Assignee: Dynamote Corporation, Seattle, Wash.

[21] Appl. No.: 600,412

[22] Filed: Oct. 18, 1990

[51] Int. Cl.$^5$ .............................................. H02M 7/00
[52] U.S. Cl. ........................................ 363/97; 363/26; 363/41; 363/98; 363/132
[58] Field of Search ...................... 363/26, 79, 41, 98, 363/17, 37, 89, 124, 24–25, 97, 132; 323/222, 266

[56] References Cited

U.S. PATENT DOCUMENTS

| | | | |
|---|---|---|---|
| 4,788,635 | 11/1988 | Heinrich | 363/35 |
| 4,814,965 | 3/1989 | Peterson | 363/65 |
| 4,855,652 | 8/1989 | Yamashita et al. | 318/268 |
| 4,864,483 | 9/1989 | Divan | 363/37 |
| 4,879,639 | 11/1989 | Tsukahara | 363/37 |
| 4,934,822 | 6/1990 | Higaki | 363/37 |
| 4,937,725 | 6/1990 | Dhyanchand | 363/56 |

Primary Examiner—Peter S. Wong
Attorney, Agent, or Firm—Christensen, O'Connor, Johnson & Kindness

[57] ABSTRACT

Disclosed is a direct current (DC) to alternating current (AC) converter (5) that receives a direct current signal from an input power source (10) to drive a load (2). A power module (16), controlled by a central processing unit (CPU) (14), includes a DC-to-DC voltage booster (20) that boosts the direct current signal from approximately 12 volts to 150 volts. A DC-to-AC inverter (70), which is also controlled by the CPU, converts the boosted DC voltage from DC to a 60 Hz AC output signal (18) used to drive the load. The power module includes a voltage feedback path and a current feedback path for regulating the AC output voltage signal in response to changes in the load (12). The voltage feedback path includes a fast integrator (36) connected in parallel with a slow integrator (34). Should the voltage on a capacitor bank (22) fall below a predetermined minimum, the slow integrator is removed from the feedback path allowing the DC-to-DC voltage booster to provide more power, thereby quickly increasing the output AC voltage signal to compensate. Since the slow integrator normally remains in the voltage feedback path, the output AC voltage signal is regulated more slowly, thereby reducing the variation of current demanded from the input power source.

33 Claims, 7 Drawing Sheets

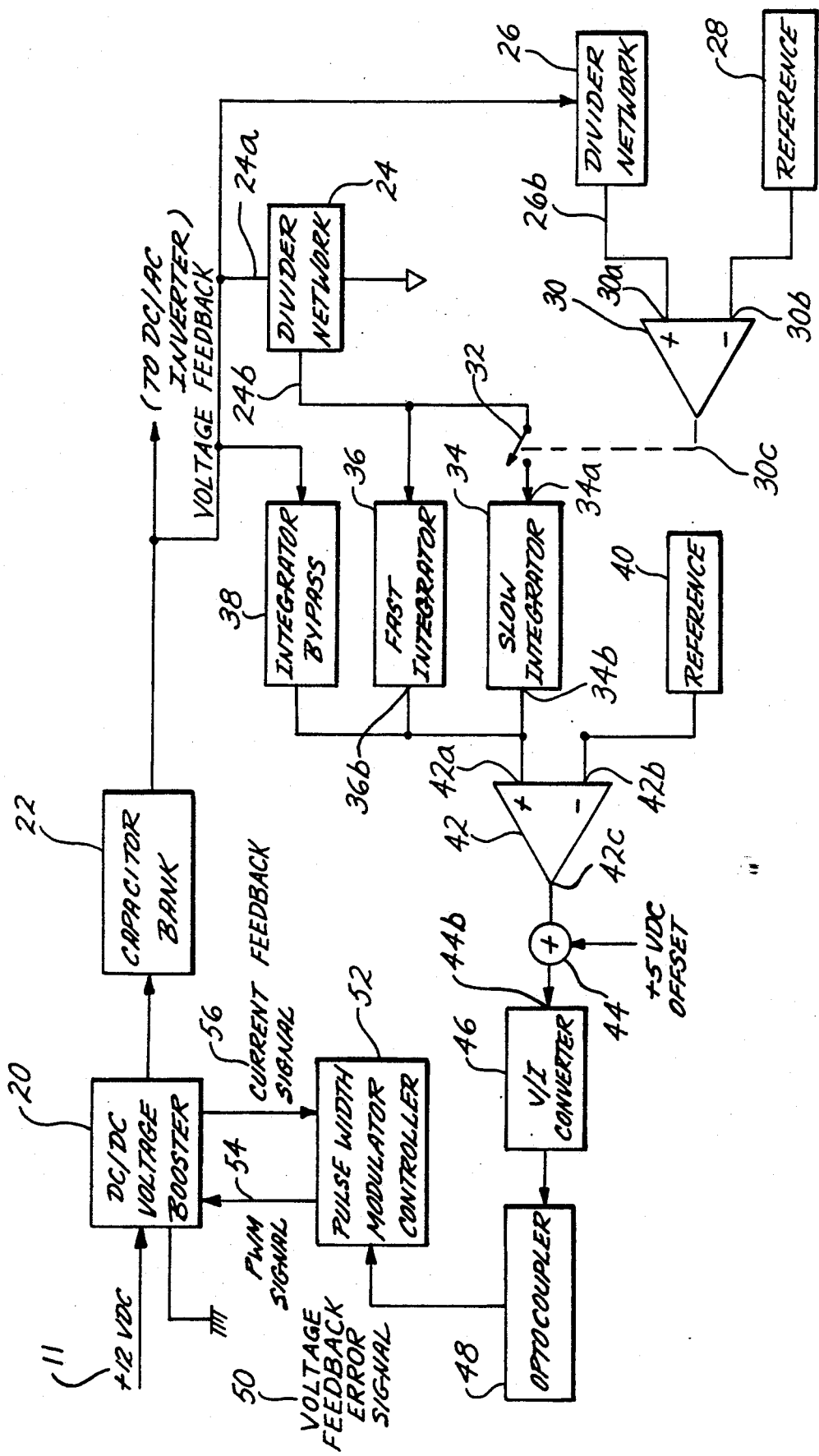

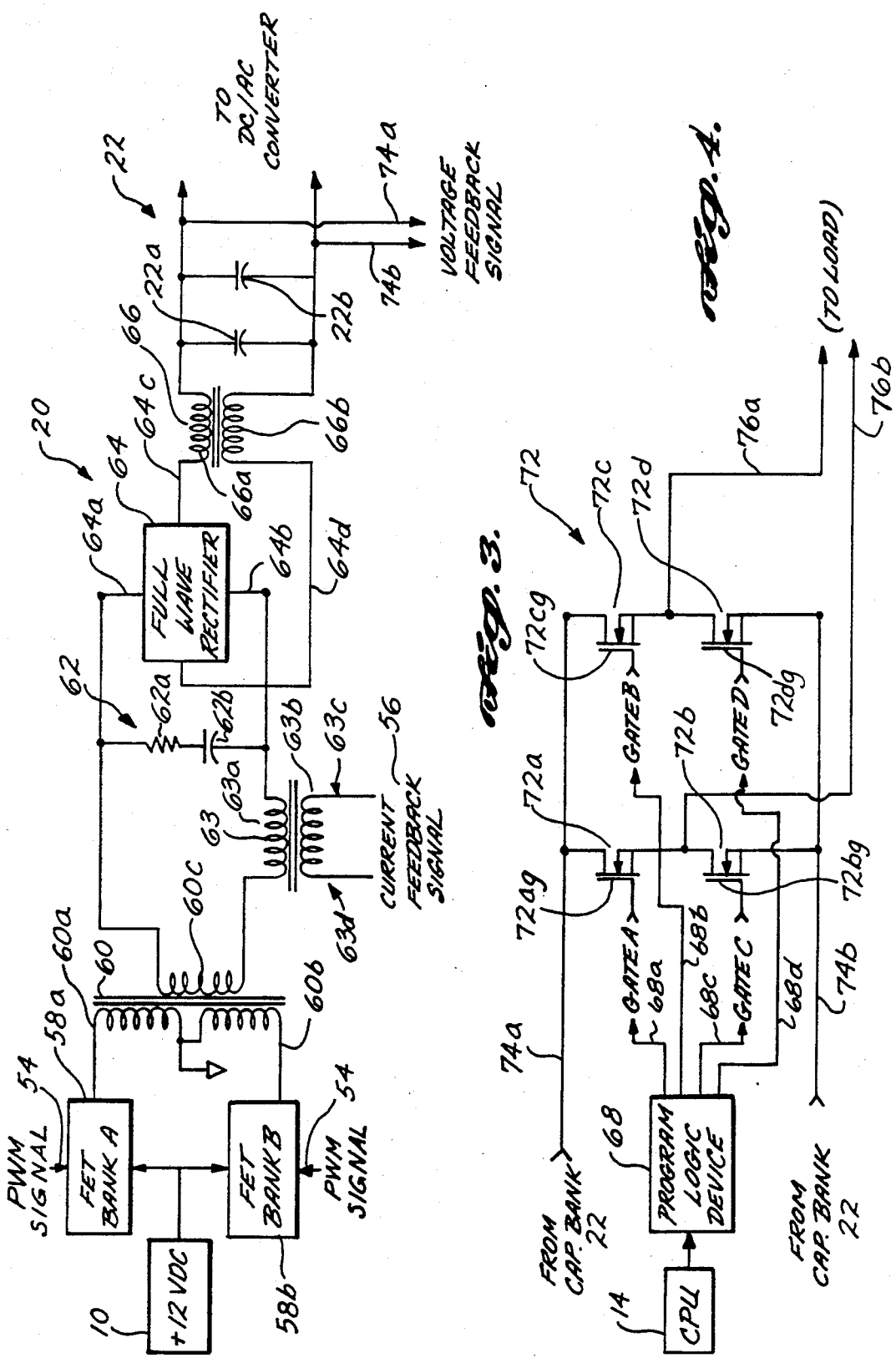

DUAL FEEDBACK LOOP DC-TO-AC CONVERTER

TECHNICAL FIELD

This invention generally pertains to apparatus and method for converting a direct current (DC) to an alternating current (AC), and more specifically, to apparatus and method for controlling the conversion process to regulate the AC in response to variations in a connected load.

BACKGROUND OF THE INVENTION

A typical DC-to-AC inverter energized from a 12-volt DC input signal uses a single stage inverter circuit to produce a quasi-sine wave output signal. The peak output signal amplitude for conventional converters of this type often varies over a wide range, e.g. from 110 volts peak to over 200 volts peak for a nominal specified output of 120 volts rms. Third and other odd order harmonics in the output of these devices are usually quite high, and because the duty cycle of the output signal typically varies with load, the harmonic content is difficult to control. Variations in the power required by the load is directly reflected back to the DC source since the conventional DC-to-AC inverter does not include adequate provision for storing energy to meet even short term peak current demands. As a result, the ratio of peak to average current demand on the source can be quite high, causing the overall efficiency of the conventional inverter to be relatively low.

Ideally, the input current to a inverter should remain constant during short term variations in the load. Most conventional inverters draw current from the DC source in a quasi-sine wave pattern that is similar to their output voltage waveform. The average current from the source for such devices is significantly higher than if the current were supplied at a substantially constant level. Due to their inefficiencies, the typical inverter tends to be relatively heavy, requiring a larger transformer than would be necessary for providing a given load current with a generally constant supply current.

In consideration of these problems with existing DC-to-AC inverters, it is an object of the present invention to provide a DC-to-AC power converter that regulates the voltage applied to a varying load without varying the pulse width of the output signal. A further object is to provide such a converter with a fixed duty cycle selected so as to minimize third harmonic content in the signal supplied to the load. Another object is to provide a two stage DC-to-AC converter that draws a generally constant current from a source of DC, meeting peak load demands with energy stored in the converter. Yet another object is to provide separate voltage and current feedback loops to control and regulate the conversion process. These and other objects and advantages of the present invention will be apparent from the attached drawings and the description of the preferred embodiment that follows.

SUMMARY OF THE INVENTION

A DC-to-AC converter in accordance with the present invention includes DC-to-DC converter means that are connected to a source of DC and are operative to the DC voltage to produce a predetermined DC voltage intermediate signal. A capacitor is connected to receive the predetermined DC voltage intermediate signal and is operative to store energy from that signal. DC-to-AC inverter means, connected to the capacitor, are provided for inverting the predetermined DC voltage intermediate signal, forming an AC output signal that can be used to power a load. Current monitoring means are included for monitoring the current of the predetermined DC voltage intermediate signal supplied to the capacitor and producing a current signal indicative of the magnitude of that current. In addition, voltage monitoring means are operative to monitor the voltage across the capacitor and to produce an error signal corresponding to the difference between that voltage and the predetermined DC voltage. The current signal and the error signal are supplied to control means that are operative to regulate the voltage of the AC signal supplied to the load in response thereto.

The voltage monitoring means comprise integrator means having selectable fast and slow integration times. The integrator means are operative to integrate a voltage derived from the voltage across the capacitor to produce an integrated signal that is used in determining the error signal. When the voltage across the capacitor is less than a predetermined minimum, the integrator means operates at the fast integration time; otherwise, the slow integration time is preferably used. Furthermore, the integration means comprise means for bypassing the integrator means if the voltage across the capacitor is greater than a predetermined maximum, thereby reducing the time required for the control means to respond to an overvoltage condition.

The DC-to-DC converter means comprise a power transformer connected to supply AC to a rectifier. Similarly, the current monitoring means comprise a transformer connected to monitor the current that the power transformer supplies to the rectifier.

Furthermore, the DC-to-AC inverter means comprise an H-bridge inverter that produces a quasi-sine wave AC output signal, each period of which includes a positive pulse and a negative pulse. The total duration of these pulses is fixed at about two-thirds of the total period of the output signal to minimize harmonics of a fundamental frequency of the output signal. Comprising the H-bridge inverter are a plurality of electronic switches that conduct current in a predetermined sequence to generate the pulses in the AC output signal. At least two of the electronic switches are made conductive between the pulses of the AC output current to short inductive or reactive current developed in any connected load.

In the converter, the control means comprise a pulse width modulator that produces a variable width pulse that is input to the DC-to-DC converter means to control the level of its higher voltage DC intermediate signal, in response to the current signal and the error signal.

For the preferred form of the invention, the DC-to-DC converter means, the capacitor, and the control means comprise a power module, and the DC-to-AC converter comprises a plurality of such modules connected in parallel to the DC-to-AC inverter means. Each module supplies a substantially equal portion of the power required by the load. Central processing means are included, for synchronizing the plurality of modules and for generating switching signals to control the frequency of the AC output signal produced by the DC-to-AC inverter means. The central processing means includes means for detecting faults in the operation of the DC-to-AC converter, causing it to shut down if faults are detected.

A method for converting DC to AC and regulating the voltage level of an AC signal supplied to a variable load is a further aspect of this invention. The steps of the method are generally consistent with the functions provided by the elements discussed above.

BRIEF DESCRIPTION OF THE DRAWINGS

FIG. 2 is a schematic diagram showing the dual feedback paths of the DC-to-DC converter incorporated within the present invention;

FIG. 3 is a schematic diagram showing the circuit used to generate both a current feedback signal and a voltage feedback signal that together comprise the dual feedback loop signals of the present invention;

FIG. 4 shows an H-bridge DC-to-AC converter and its accompanying drive circuitry;

DESCRIPTION OF THE PREFERRED EMBODIMENT

Figure 1:
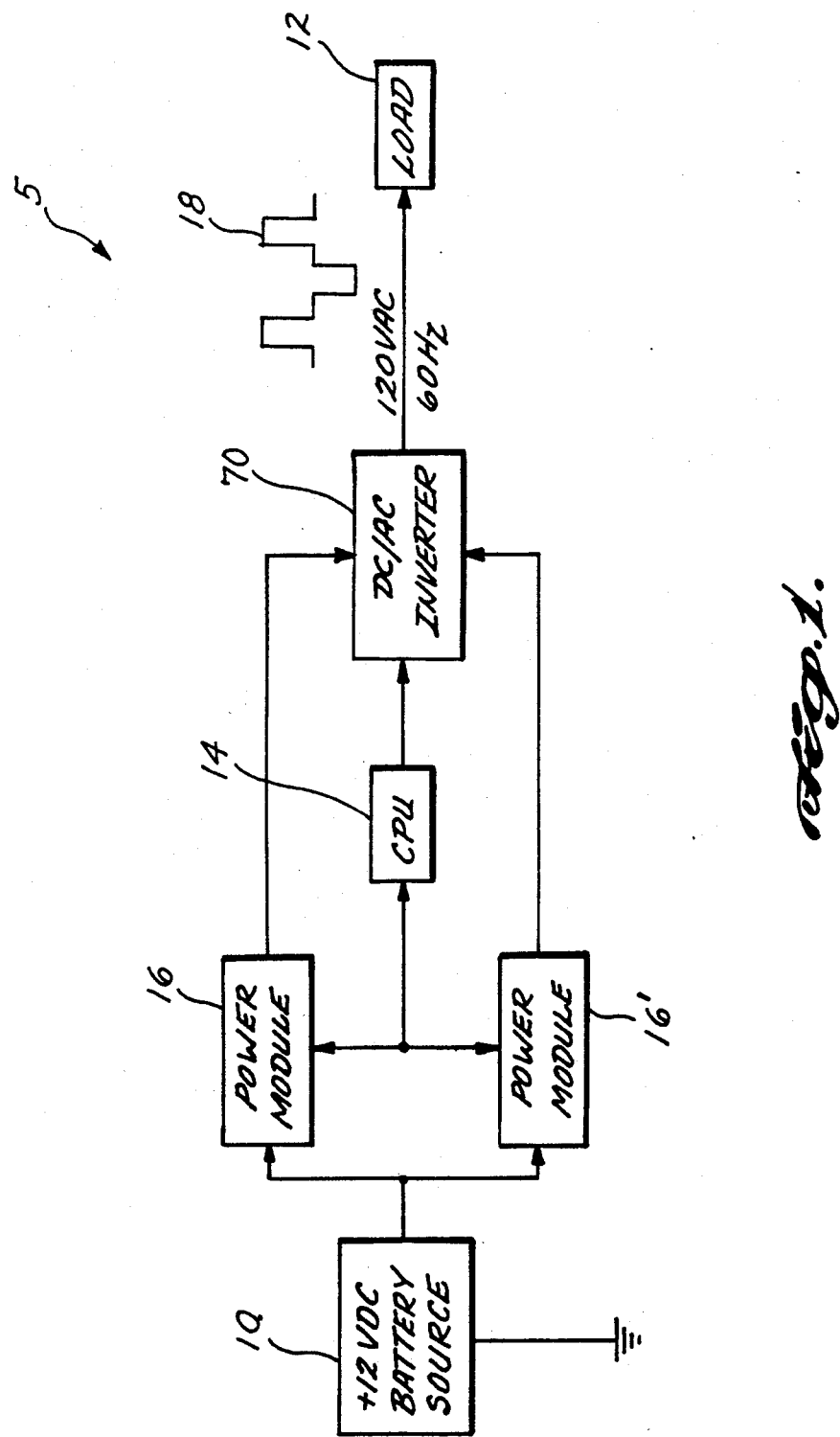
FIG. 1 is a schematic block diagram showing the overall configuration of a dual feedback loop DC-to-AC converter according to the present invention.

FIG. 1 is a schematic block diagram depicting the preferred embodiment of a dual feedback loop DC-to-AC converter 5, according to the present invention. A direct current (DC) signal supplied by an input power source 10, e.g., a 12-volt battery, is converted to a 120-volt AC, 60 Hz, output voltage signal 18 for use in driving a load 12. DC-to-AC converter 5 includes at least one power module 16 that supplies an intermediate boosted DC voltage to the input of a single DC-to-AC inverter 70. The operation of power module 16 and DC-to-AC inverter 70 is monitored and controlled by a central processing unit (CPU) 14. In the preferred embodiment, DC-to-AC converter 5 comprises two power modules 16 and 16', each connected in parallel between input power source 10 and a DC-to-AC inverter 70. In this configuration, DC-to-AC converter 5 can supply up to 2000 watts of power. To achieve higher rated capacity, additional power modules can be connected in parallel with DC-to-AC inverter 70. Even higher rated capacity can be obtained by using additional DC-to-AC inverter 70, for example, by connecting two DC-to-AC converters 5 in parallel between the input power source and the load (but controlling them with only one CPU 14).

FIG. 2 is a schematic diagram showing details of each power module 16, including the dual feedback paths provided for DC-to-AC converter 5. The input power source in this preferred embodiment provides a nominal 12-volt DC voltage 11 that is increased by magnitude by a DC-to-DC voltage booster 20, to approximately 150 volts DC. The boosted output voltage of DC-to-DC voltage booster 20 is applied to a capacitor bank 22, which stores energy needed to meet short term increases in the current required by load 12. Alternatively, if the DC voltage from the input power source exceeds the predetermined level that is to be applied and maintained on capacitor bank 22, a DC-to-DC voltage buck converter (not shown) could be used instead of DC-to-DC voltage booster 20. For example, if the voltage supplied from input power source 10 is 200 VDC, the voltage buck converter can be used to supply and maintain 150 VDC on capacitor bank 22. Details of DC-to-DC voltage booster 20 and of the alternative voltage buck converter are set forth below.

Connected to capacitor bank 22 is an input lead 24a of a first voltage divider network 24. An output lead 24b of first voltage divider network 24 is connected to a fast integrator 36 via input lead 36a. First voltage divider network 24 is a fixed ratio divider that steps the voltage at capacitor bank 22 down from a predetermined level of approximately 150 volts DC on input lead 24a to approximately 5 volts DC on output lead 24b. Lead 24b is connected to the input of fast integrator 36 and to one side of an electronic switch 32.

A second voltage divider network 26 is connected through input lead 24a to capacitor bank 22. An output lead 26b of the second voltage divider network, is connected to a non-inverting input terminal 30a of a comparator 30. Second voltage divider network 26 is a fixed ratio divider that provides an output signal on output lead 26b proportional to the voltage at capacitor bank 22. An inverting input terminal 30b of comparator 30 is connected to a regulated reference voltage source 28, which produces a reference voltage derived from input power source 10. Comparator 30 has an output terminal 30c that conveys a signal controlling the open or closed state (i.e., the conductivity) of electronic switch 32. This signal is a function of the difference between the output signal of second voltage divider network 26 and reference voltage source 28.

When closed, electronic switch 32 connects an input lead 34a of a slow integrator 34 to the voltage on output lead 24b of voltage divider network 24. Slow integrator 34 has an output lead 34b that is connected to a non-inverting input terminal 42a of a differential amplifier 42. An output lead 36b similarly connects fast integrator 36 to input terminal 42a of differential amplifier 42. When electronic switch 32 is in its normal conductive state, slow integrator 34 is connected in parallel with fast integrator 36 between voltage divider network 24 and differential amplifier 42. The slow integration time constant of slow integrator 34 overrides the effect of fast integrator 36 unless the output voltage of comparator 30 causes electronic switch 32 to become non-conductive.

An overvoltage integrator bypass 38 is connected between output lead 24b and output lead 36b, and in the preferred embodiment, acts to limit the voltage on capacitor bank 22 to about 160 volts DC by shunting current that would otherwise charge either fast integrator 36 or slow integrator 34 if an overvoltage condition is experienced. A regulated reference voltage is provided by a reference 40. This reference voltage is applied to an inverting input terminal 42b of differential amplifier 42. The magnitude of this reference voltage is set so that it is proportional to the magnitude of the desired output voltage applied to the load, and thus proportional to the desired DC voltage to be maintained across capacitor bank 22. The output of differential amplifier 42 therefore corresponds to the difference between the actual output voltage of DC-to-AC inverter 70 and the desired output voltage of DC-to-AC converter 5. However, control of the voltage applied to load 12 is carried out by reference to the DC voltage across capacitor bank 22.

An output lead 42c of differential amplifier 42 connects the output signal of the differential amplifier to a summing junction 44. Also connected to summing junction 44 is an offset voltage that shifts the output signal of differential amplifier 42 by approximately 5 volts DC. This offset voltage allows use of a non-zero control level. The output signal of summing junction 44 drives a voltage-to-current converter 46, which converts the voltage level of the output signal to a proportional current.

The current level of the output signal of voltage-to-current converter 46 in turn drives an optocoupler 48, which is used to provide electrical isolation in the voltage feedback loop. The output of the optocoupler is connected to a pulse width modulator (PWM) controller 52. PWM controller 52 generates a pulse width modulation signal 54 having a duty cycle that varies partly in response to a voltage feedback error signal 50 provided from optocoupler 48. In addition, PWM controller 52 also receives a current feedback signal 56 from DC-to-DC voltage booster 20 that responds to cycle-by-cycle current. Employing current-mode control, PWM controller 52 acts in response to both the current feedback signal and the voltage feedback error signal to vary the duty cycle of pulse width modulation signal 54. In the preferred embodiment, PWM controller 52 is a type UC 3846 manufactured by Unitrode Corporation; however, other pulse width modulator controllers having similar characteristics can be used for this purpose.

The output voltage of DC-to-DC voltage booster 20 is regulated by the error voltage and current feedback loops in this embodiment as follows. The output voltage of DC-to-DC voltage booster 20 is stepped down to a lower level in a fixed ratio by voltage divider networks 24 and 26. If the voltage at capacitor bank 22 falls below a predetermined threshold (140 volts DC in the preferred embodiment), the voltage applied to non-inverting input terminal 30a of comparator 30 drops below the reference voltage applied to inverting input terminal 30b, causing the output signal of comparator 30 to switch electronic switch 32 to its non-conductive state, effectively removing slow integrator 34 from non-inverting input terminal 42a of differential amplifier 42.

Fast integrator 36 is designed to have a small RC time constant (less than a half cycle of AC output voltage signal 18); therefore, the output signal of fast integrator 36 quickly responds to changes in the voltage on capacitor bank 22 caused by transient variations in the load. Differential amplifier 42 has a gain equal to the fixed divider ratio of voltage divider network 24 so that it amplifies any difference in voltage between input terminals 42a and 42b to their corresponding level on capacitor bank 22. The output of differential amplifier 42 therefore generally corresponds to the actual integrated ripple voltage on capacitor bank 22, and when slow integrator 34 is connected to voltage divider network 24 output (as it normally is), the output current from differential amplifier 42 is nearly a continuous DC with only a small AC ripple component. Since slow integrator 34 averages the voltage on capacitor bank 22 over many cycles, its response to large load increases is also slow. However, during initial startup and in response to transient load surges, the voltage on capacitor bank 22 is likely to fall below 140 volts DC, causing fast integrator 36 to take control as electronic switch 32 becomes non-conductive. In any case, if reference voltage 40 is greater in magnitude than the input voltage to non-inverting input terminal 42a, differential amplifier 42 produces a negative output signal at output lead 42c. Conversely, a positive output signal is produced at output lead 42c if the magnitude of the voltage at non-inverting input terminal 42a is greater than the magnitude of the voltage at inverting input terminal 42b.

The output signal of differential amplifier 42 is added to the +5 V DC offset voltage at summing junction 44 and the result is input to voltage-to-current converter 46. The current output from the voltage-to-current converter is proportional to the voltage of its input signal and drives a light emitting diode (not shown), which produces light having an intensity proportional to the supplied current. This light induces a photo-transistor (not shown) to produce voltage feedback error signal 50 that is provided to PWM controller 52. Voltage feedback error signal 50 in connection with current feedback signal 56 causes PWM controller 52 to vary the duty cycle of the control pulse width modulation signal 54 by an amount proportional to both variations in the voltage at capacitor bank 22 from its nominal 150 volts DC and the level of current flowing into capacitor bank 22. DC-to-DC voltage booster 20 responds to the duty cycle of pulses in the control pulse width modulation signal 54 by varying the output voltage of this DC-to-DC voltage booster so as to maintain the nominal 150 volts DC across capacitor bank 22, thereby completing the voltage error feedback loop.

FIG. 3 shows DC-to-DC voltage booster 20 in greater detail. The DC-to-DC voltage booster includes a pair of parallel (connected) FET banks 58a and 58b. The conductivity of parallel FET banks 58a and 58b is controlled by drivers (not separately shown) that are connected to and responsive to pulse width modulation signal 54. When gated on by the drivers, FET banks 58a and 58b pass current from input power source 10 through primary windings 60a and 60b of a center-tapped transformer 60. The center tap is connected to the ground or negative side of input power source 10. In the preferred embodiment, FET banks 58a and 58b comprise two parallel symmetrical banks of six MOSFETs each (not separately shown) arranged in a common drain, push-pull configuration. The common drain configuration, though unconventional, allows direct connection of the FET drain terminals to the positive side of input power source 10. Each gate of the FETs comprising FET banks 58a and 58b is driven by one of the drivers in response to pulse width modulation signal 54, producing a pulsed current signal that is alternately applied at opposite ends of primary windings 60a and 60b.

A generally conventional full-wave rectifier 64 having AC input leads 64a and 64b is connected to a secondary winding 60c of center-tapped transformer 60 to convert the AC output voltage on secondary winding 60c to a DC voltage that is applied to capacitor bank 22 through DC output leads 64c and 64d. The turns ratio of primary windings 60a and 60b relative to secondary winding 60c is selected so that transformer 60 produces a higher voltage AC signal on its secondary winding than is applied to its primary windings.

As noted above, DC-to-DC voltage booster 20 can be replaced by a DC-to-DC voltage buck converter to controllably reduce the DC voltage level of an input power source 10 that exceeds the desired DC voltage across capacitor bank 22. A turns ratio of 17 to 1 is used in connection with a 12 VDC power input source 10. To provide a DC-to-DC voltage buck converter, a different turns ratio center-tapped transformer (not shown) must be used in place of center-tapped transformer 60.

Similarly, the turns ratio of the transformer must be selected to appropriately boost the DC voltage from an input power source providing other than a nominal 12 VDC voltage level, but less than the required voltage across capacitor bank 22, or to provide a higher AC output signal.

For example, to provide an AC output voltage signal 18 of 220 VAC from a nominal 12 VDC input power source, an appropriate turns ratio (e.g., 32 to 1) center-tapped transformer must be used, and the DC reference voltage levels provided by references 40 and 28 and used by integrator bypass 38 (in FIG. 2) must be appropriately increased or the divider ratios of voltage divider networks 24 and 26 appropriately selected to accommodate a higher predetermined nominal DC voltage across capacitor bank 22, e.g., about 275 VDC. Those of ordinary skill in this art will clearly understand how to accomplish these adjustments.

Attached in series with secondary winding 60c of center-tapped transformer 60 is a primary winding 63a of a current-sensing transformer 63. A secondary winding 63b of the transformer has two output leads 63c and 63d, which are connected to PWM controller 52. The current generated in secondary winding 63b comprises current feedback signal 56 that is used to control PWM controller 52, as shown in FIG. 2. One advantage of using current feedback signal 56 in conjunction with voltage feedback error signal 50 to control PWM controller 52 is that current control feedback from this point in DC-to-AC converter 5 allows easy paralleling of multiple power modules 16 and 16' (shown in FIG. 1) as well as excellent over-current protection for FET banks 58a and 58b and center-tapped transformer 60. An RC output snubber 62, which includes a resistor 62a and a capacitor 62b, is connected across the input of full-wave rectifier 64 to limit noise spikes caused by ringing resulting from inductance in transformer 60 and capacitance of the full-wave rectifier.

A cross-coupled dual inductor 66 has a first winding 66a connected in series between DC output lead 64c of full-wave rectifier 64 and the positive side of two parallel connected capacitors 22a and 22b that comprise capacitor bank 22. A second winding 66b of dual inductor 66 is connected in series between DC output lead 64d of full-wave rectifier 64 and the negative side of capacitors 22a and 22b and is magnetically coupled to first winding 66a and wound so that the phases of the currents in the windings add. Dual inductor 66 is used to filter the output signal of full-wave rectifier 64.

FIG. 4 shows in detail the circuitry comprising DC-to-AC inverter 70. Inversion of the DC output voltage from capacitor bank 22 is accomplished using a generally conventional configuration H-bridge circuit 72 having input leads 74a and 74b connected across capacitors 22a and 22b, and output leads 76a and 76b. H-bridge circuit 72 comprises metal oxide semiconductor field effect transistors (MOSFETs) 72a, 72b, 72c, and 72d, each having a gate 72ag, 72bg, 72cg, and 72dg, respectively. The gates of FETs 72a, 72b, 72c, and 72d are connected to a programmed logic device 68 via four output leads 68a, 68b, 68c, and 68d, respectively. CPU 14 is connected to control programmed logic device 68. The programmed binary logic device in turn controls the order, timing, and duration of gate signals that are generated thereby and supplied to the MOSFETs on output leads 68a, 68b, 68c and 68d. CPU 14 thus determines the frequency of AC output voltage signal 18, enabling the user to readily select, for example, a 50 Hz or 60 Hz frequency for this signal. AC output voltage signal 18 is developed between output leads 76a and 76b as the programmed binary logic device supplies gates 72ag and 72dg with a gate signal that turns on the MOSFETs, thereby developing a negative half cycle of AC output voltage signal 18; then, a signal is supplied to gates 72bg and 72cg that turns on MOSFETs 72b and 72c, thereby developing a positive half cycle of output voltage 18. Advantages of the timing scheme used to turn on MOSFETs 72a, 72b, 72c and 72d to produce AC output voltage signal 18 shown in FIG. 5 are discussed below.

Figure 5:
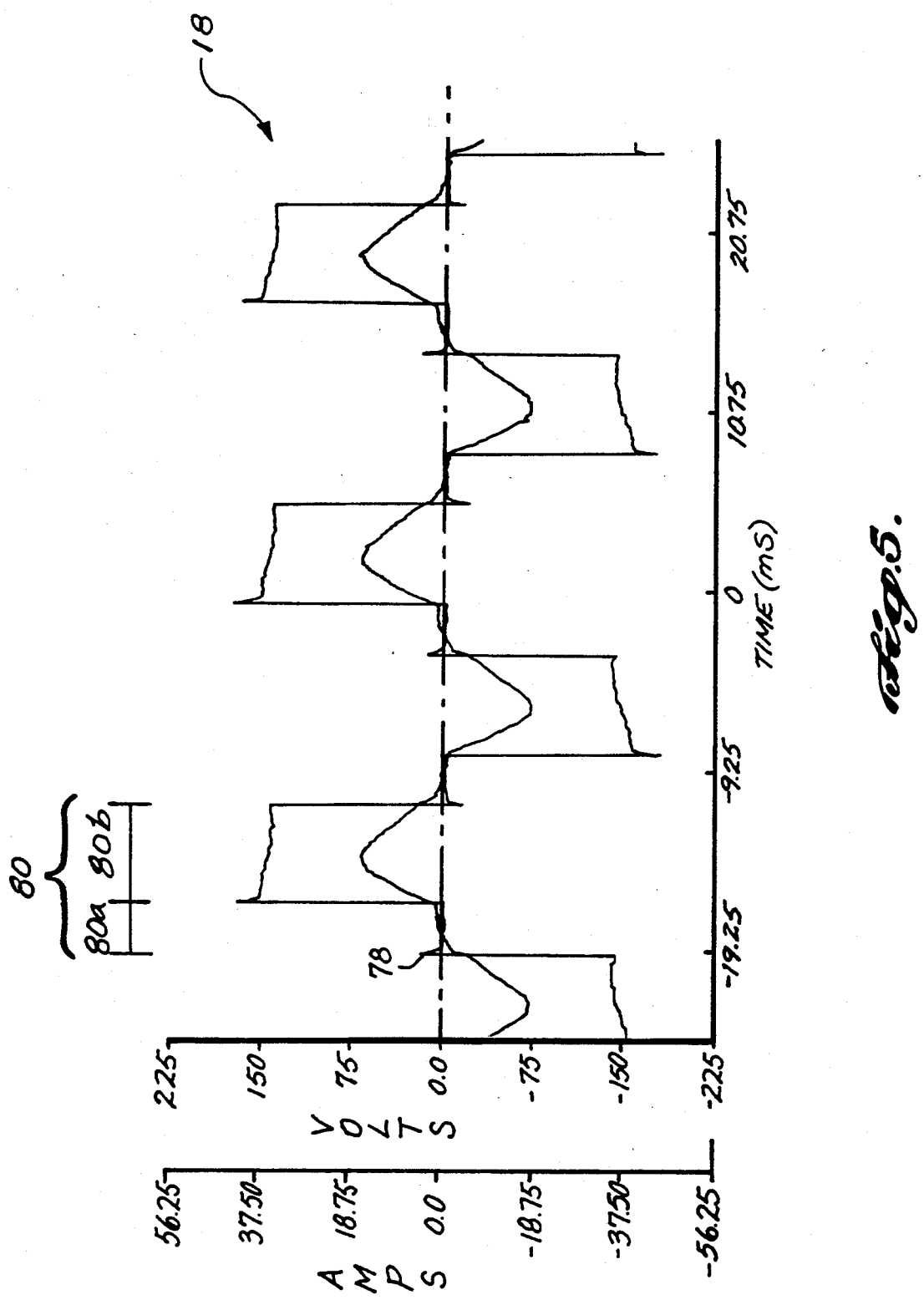
FIG. 5 is a graph of the output AC voltage and current supplied by the DC-to-AC converter of the present invention, when driving a load.

FIG. 5 is a graph of output voltage signal 18 and output current produced by the DC-to-AC converter of the present invention while driving a load. Output voltage signal 18 is a quasi-sine wave signal that has a half-duty cycle 74 with an off time 80a and a pulse time 80b. One of the novel aspects of the AC voltage signal waveform supplied by DC-to-AC converter 5 is the ratio between pulse time 80b and overall half-duty cycle 74. CPU 14 provides a timing signal to programmed logic device 68, causing pulse time 80b to equal two-thirds of half-duty cycle 74, thereby substantially eliminating third harmonic distortion of output voltage 18. Another novel aspect of the operation of H-bridge circuit 72 shown in FIG. 4 is the provision that MOSFETs 72b and 72d remain energized during the off time 80a of each (positive and negative) half-duty cycle 74 of AC output voltage signal 18. MOSFETs 72b and 72d thus provide a current path between output leads 76a and 76b that conducts inductive and reactive load current, effectively short-circuiting this current.

Figure 6:
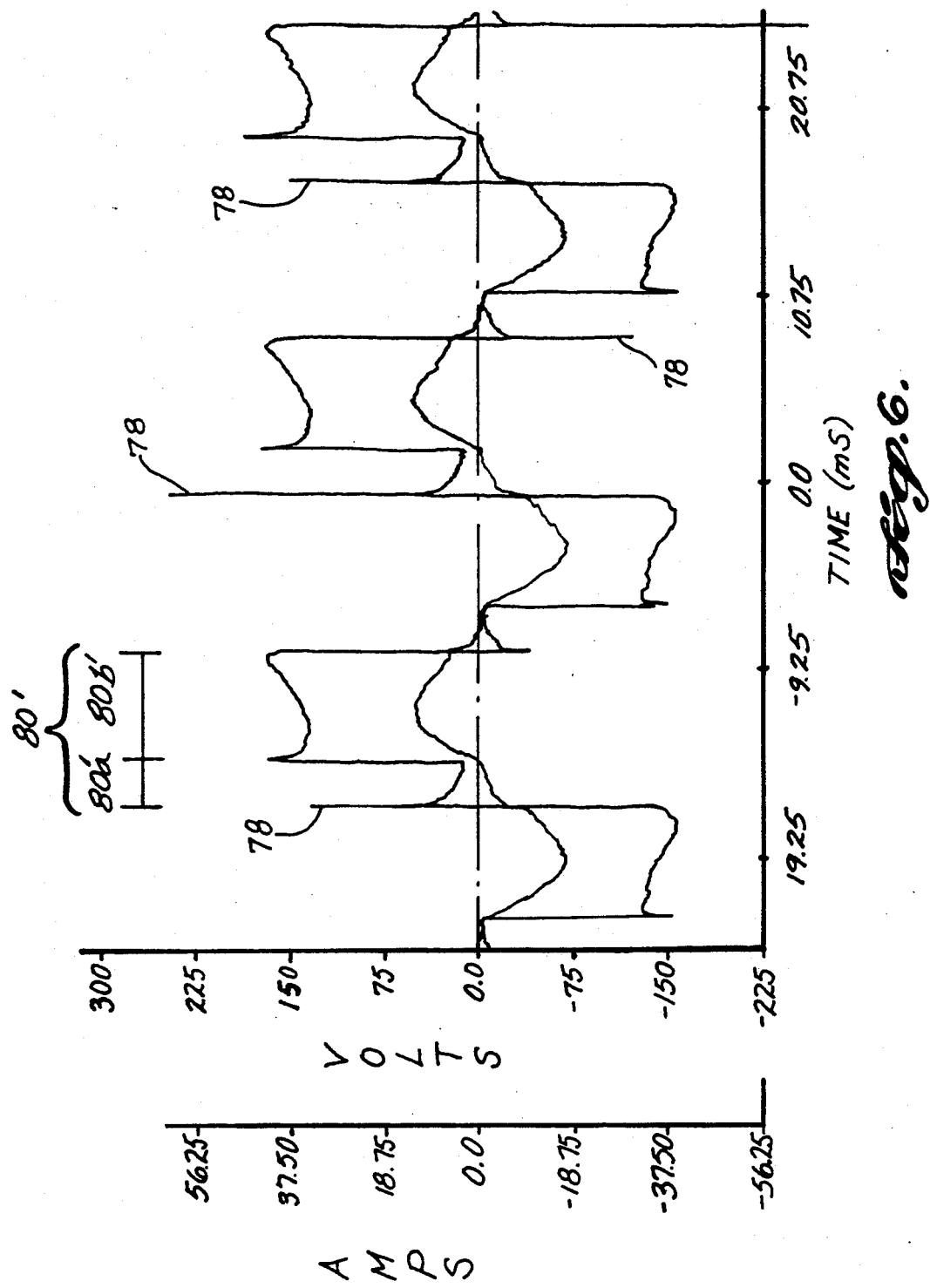
FIG. 6 is a graph of the output AC voltage and current of a typical prior art DC-to-AC converter when driving the load.

FIG. 6 is a graph of an output voltage waveform obtained from a typical prior art DC-to-AC inverter while driving a load. As can be seen by comparing FIGS. 5 and 6, AC output voltage signal 18 produced by the DC-to-AC converter of the present invention has a fixed duty cycle of ⅔, only a very small voltage spike at the beginning of each pulse, and exhibits almost no phase shift. In contrast, the output waveform of the prior art device includes an extremely high spike 78 at the beginning of each half cycle. In fact, the spike occurring just prior to zero (0) milliseconds in the graph of the prior art device waveform is greater than 250 volts and could easily damage electronic components being driven by such a DC-to-AC inverter. Since the present invention exhibits negligible spikes, it does not expose the load to such high and potentially damaging voltages. Although not evident in the graph, the waveform of the prior art inverter also has a variable duty cycle (varies in response to load) and exhibits variable phase shift from cycle-to-cycle.

Figure 7:
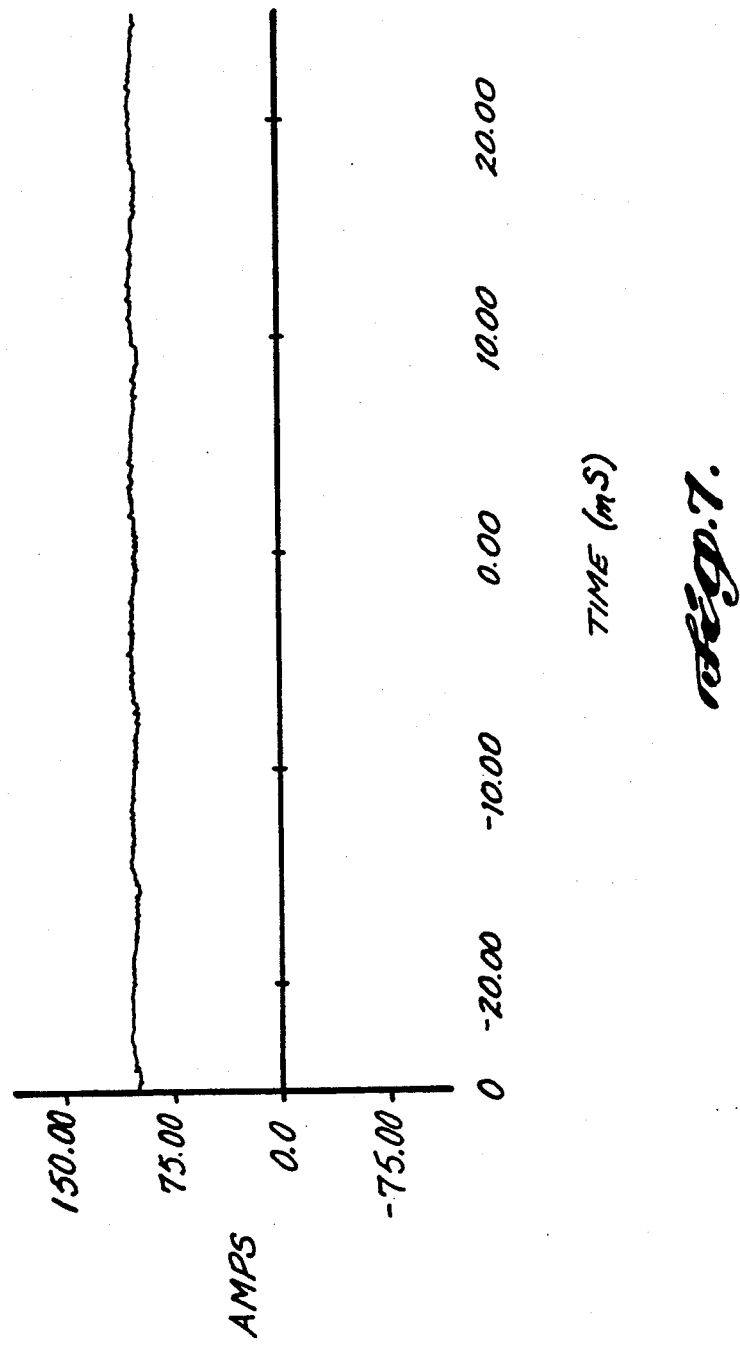
FIG. 7 is a graph of input DC current for the DC-to-AC converter of the present invention when driving the load.
Figure 8:
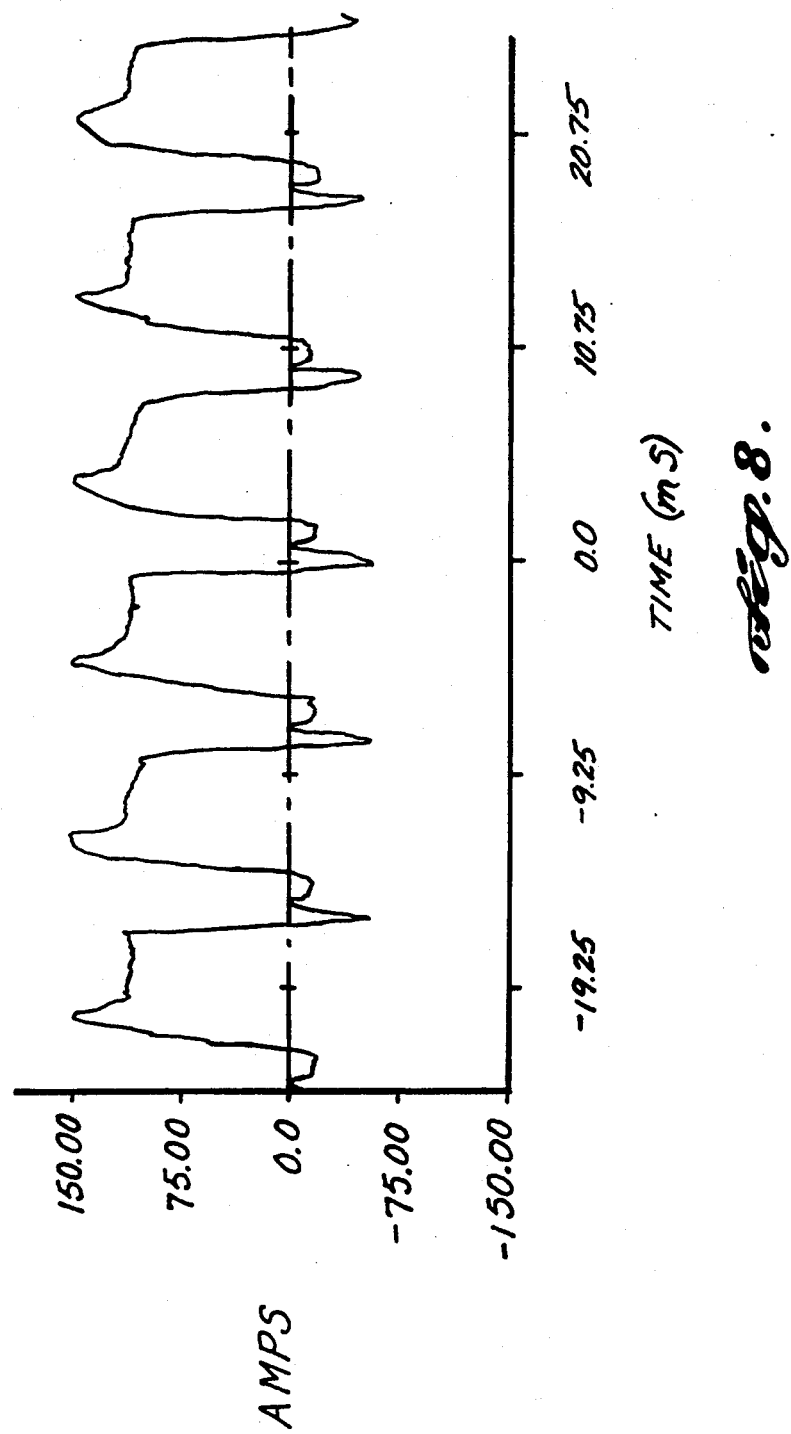
FIG. 8 is a graph of the input current for the prior art DC-to-AC converter when driving the load.

FIG. 7 shows the current demand placed upon input power source 10 by the DC-to-AC converter of the present invention while driving the same load referenced in respect to FIG. 5. As can be seen, the current demand on the input power source remains relatively constant. In comparison, FIG. 8 shows the current demand placed upon an input power source by the prior art DC-to-AC inverter while driving this load. It should be clear that the current demand of the prior art device on an input power source varies generally in sync with the output voltage waveform. The average of the current demand of the prior art device is greater than the generally constant current demand of the present invention (for the same load). By keeping the input current from the input power source relatively constant, a given input power source can drive a load for a longer period of time than has previously been possible using prior art DC-to-AC inverters.

As will be apparent from the foregoing discussion and FIGS. 1-8, DC-to-AC converter 5 has significant advantages over the DC-to-AC inverters of the prior art. By using the apparatus and method disclosed above in respect to the preferred embodiment of the present invention, the current demand placed upon input power source 10 is held relatively constant. Furthermore, phase shift and overvoltage spikes associated with the output AC voltage waveform produced by a typical DC-to-AC inverter are substantially eliminated.

Although the present invention has been disclosed with reference to the preferred embodiment, those of ordinary skill in the art will recognize that changes thereto may be made in form and detail without departing from the spirit and scope of the invention as claimed below.

The invention in which an exclusive property or privilege is claimed is defined as follows:

1. A direct current (DC) to alternating current (AC) converter, comprising:
   a. DC-to-DC converter means, connected to a source of DC, for producing an intermediate DC voltage signal;
   b. a capacitor connected to receive the intermediate DC voltage signal and operative to store energy from that signal;
   c. DC-to-AC inverter means, connected to the capacitor, for inverting the intermediate DC voltage signal, forming an AC output signal that can be used to power a load;
   d. current monitoring means for monitoring the current of the intermediate DC voltage signal supplied to the capacitor and producing a current signal indicative of the magnitude of that current;
   e. voltage monitoring means for monitoring the intermediate DC voltage signal across the capacitor and producing an error signal corresponding to the difference between the intermediate DC voltage signal and a predetermined DC voltage, wherein the voltage monitoring means comprise integrator means having selectable short and long integration times, for integrating a voltage derived from the intermediate DC voltage signal across the capacitor to produce an integrated signal that is used in determining the error signal; and
   f. control means, connected to receive the current signal and the error signal, for regulating the voltage of the intermediate DC voltage signal, and thus the AC output signal supplied to the load by the DC-to-AC inverter means, in response to the current signal and the error signal.

2. The DC-to-AC converter of claim 1, wherein said integrator means operates with the short integration time when the intermediate DC voltage signal across the capicator is less than a predetermined minimum and otherwise generally operates with the long integration time.

3. The DC-to-AC converter of claim 2, wherein the voltage monitoring means further comprise means for bypassing the integrator means if the intermediate DC voltage signal across the capacitor is greater than a predetermined maximum, thereby reducing the time required for the control means to respond to an overvoltage condition.

4. The DC-to-AC converter of claim 1, wherein the DC-to-DC converter means comprise a power transformer connected to supply AC to a rectifier, and wherein the current monitoring means comprise a transformer connected to monitor the current that the power transformer supplies to the rectifier.

5. The DC-to-AC converter of claim 1, wherein the DC-to-AC inverter means comprise an H-bridge inverter that produces a quasi-sine wave AC output signal, each period of the AC output signal including a positive pulse and a negative pulse, the duration of each of these pulses being fixed at about one-third of the period of the output signal to minimize a third harmonic distortion of the AC output signal.

6. The DC-to-AC converter of claim 1, wherein the control means comprise a pulse width modulator that produces a variable width pulse for input to the DC-to-AC converter means to control the level of the intermediate DC voltage signal, in response to the current signal and the error signal.

7. The DC-to-AC converter of claim 1, wherein the DC-to-DC converter means, the capacitor, and the control means comprise a power module, the DC-to-AC converter comprising a plurality of such power modules connected in parallel to the DC-to-AC inverter means, each power module supplying a substantially equal portion of the power required by the load.

8. The DC-to-AC converter of claim 7, further comprising central processing means for synchronizing the plurality of power modules and for generating switching signals to control the frequency of the AC output signal produced by the DC-to-AC inverter means, the central processing means including means for detecting faults in the operation of the DC-to-AC converter, causing it to shut down if a fault is detected.

9. The DC-to-AC converter of claim 5, wherein the H-bridge inverter includes a plurality of electronic switches that conduct current in a predetermined sequence to generate the pulses in the AC output signal, at least two of the electronic switches being made conductive between the pulses of the AC output current to short inductive or reactive current in the load.

10. The DC-to-AC converter of claim 1, wherein the DC-to-AC converter means comprise a DC-to-AC voltage boost circuit that increases the intermediate DC voltage signal supplied by the source to equal the predetermined DC voltage intermediate signal level.

11. The DC-to-AC converter of claim 1, wherein the DC-to-DC converter means comprise a DC-to-DC voltage feedback circuit that varies the intermediate DC voltage signal supplied by the DC-to-DC converter means to equal the predetermined DC voltage.

12. A DC-to-AC converter for supplying a regulated AC to a load at a predetermined frequency from a DC power source, comprising:
   a. a DC-to-DC converter connected to the DC power source, including means for producing a high frequency AC that is transformed and rectified to provide a controlled intermediate DC voltage that can differ from the DC voltage of the DC power source;
   b. a capacitor bank for storing energy of the intermediate DC voltage provided by the DC-to-DC converter, this stored energy being used to meet short-term peak power demands of the load;

c. a DC-to-AC inverter connected to the capacitor bank and operative to convert the intermediate DC voltage across the capacitor bank to an AC output signal having quasi-sine wave shaped positive and negative pulses during each period thereof;

d. a current transformer for producing a current signal indicative of the current in the DC-to-DC converter;

e. a voltage monitoring circuit for producing an error signal as a function of the difference between the intermediate DC voltage across the capacitor bank and a reference voltage, wherein the voltage monitoring means include integrator means for integrating the intermediate DC voltage across the capacitor bank with a short time constant, if the intermediate DC voltage is less than a predetermined minimum value and otherwise, with a long time constant, thereby producing an integrated signal for comparison with the reference voltage; and f. pulse width control means, connected to receive the current signal and the error signal, for producing a variable pulse width signal that regulates the intermediate DC voltage produced by the DC-to-DC converter in response to both the current signal and the error signal, thereby regulating the AC output signal from the DC-to-AC inverter.

13. The DC-to-AC converter of claim 12, wherein the voltage monitoring means further include means for bypassing the integration means while producing the error signal, if the intermediate DC voltage across the capacitor bank is greater than a predetermined maximum value.

14. The DC-to-AC converter of claim 12, wherein the DC-to-AC inverter comprises an H-bridge having a plurality of electronic switches that are energized in a predetermined sequence at a controlled frequency to produce the positive and negative pulses, at least two of the electronic switches being energized during time intervals between the pulses in order to conduct as a short circuit reactive or inductive current developed by the load.

15. The DC-to-AC converter of claim 12, wherein the DC-to-DC converter, the capacitor bank, and the pulse width control means comprise a module, and wherein the DC-to-AC converter comprises a plurality of such modules connected in parallel between the DC power source and the DC-to-AC inverter, each module supplying substantially an equal share of the intermediate DC voltage input to the DC-to-AC inverter.

16. The DC-to-AC converter of claim 12, further comprising central processing means for controlling the DC-to-DC converter and the DC-to-AC inverter, the central processing means being operative to establish the frequency of the AC output signal, and to monitor the operation of the DC-to-AC converter in order to detect faults.

17. The DC-to-AC converter of claim 12, wherein variations in the current required by the load are averaged over a plurality of cycles of the AC output signal using energy stored in the capacitor bank, thereby maintaining a substantially uniform demand for current supplied from the DC power source.

18. A method for converting DC to AC and regulating the voltage level of an AC signal supplied to a variable load, comprising the steps of:

a. variably controlling power supplied from a DC source to obtain an intermediate DC voltage signal by converting a DC power signal from the DC source to a high frequency AC signal, transforming the high frequency AC signal to an AC voltage, and rectifying the AC voltage to a DC voltage that can differ from that of the DC source;

b. storing energy in a capacitor substantially at a predetermined DC voltage level;

c. inverting the intermediate DC voltage signal, producing an AC output signal;

d. monitoring a DC supplied to charge the capacitor to the predetermined DC voltage level, producing a current signal indicative of a magnitude of that DC;

e. monitoring the intermediate DC voltage signal across the capacitor, producing an error signal indicative of the difference between that voltage and the predetermined DC voltage level;

f. regulating the intermediate DC voltage signal in response to the current signal and the error signal, by controlling the power supplied by the DC source, thereby regulating the AC output.

19. The method of claim 18, wherein the step of monitoring the intermediate DC voltage signal comprises the step of integrating the error signal using either a short time constant or a long time constant, the long time constant being used unless the intermediate DC voltage signal across the capacitor is less than a predetermined minimum.

20. The method of claim 19, wherein a pulse width of the higher frequency AC signal is controlled in response to the current signal and integration of the error signal using either the short time constant or the long time constant to regulate the voltage level of the AC output signal supplied to the load.

21. A direct current (DC) to alternating current (AC) converter, comprising:

a. DC-to-DC converter means, connected to a source of DC voltage, for producing an intermediate DC voltage signal, the DC-to-DC converter means including a DC-to-AC converter, a rectifier, and a power transformer connected to supply AC from the DC-to-AC converter to the rectifier that produces the intermediate DC voltage signal;

b. a capacitor connected to receive the intermediate DC voltage signal and operative to store energy from that signal;

c. DC-to-AC inverter means, connected to the capacitor, for inverting the intermediate DC voltage signal, thereby forming an AC output signal that can be used to power a load;

d. current monitoring means that includes a transformer connected to monitor the AC that the power transformer supplies to the rectifier, wherein the current monitoring means produces a current signal indicative of the magnitude of that AC;

e. voltage monitoring means for monitoring the intermediate DC voltage signal across the capacitor and producing an error signal corresponding to the difference between the intermediate DC voltage signal and a predetermined DC voltage; and f. control means, connected to receive the current signal and the error signal, for regulating the voltage of the intermediate DC voltage signal, and thus the AC output signal supplied to the load by the DC-to-AC inverter means, in response to the current signal and the error signal.

22. The DC-to-AC converter of claim 21, wherein the voltage monitoring means comprise integrator means having selectable short and long integration times, for integrating a voltage derived from the intermediate DC voltage signal across the capacitor to produce an integrated signal that is used in determining the error signal, said integrator means operating with the short integration time when the intermediate DC voltage signal across the capacitor is less than a predetermined minimum and otherwise generally operating with the long integration time.

23. The DC-to-AC converter of claim 22, wherein the voltage monitoring means further comprise means for bypassing the integrator means if the intermediate DC voltage signal across the capacitor is greater than a predetermined maximum, thereby reducing the time required for the control means to respond to an overvoltage condition.

24. The DC-to-AC converter of claim 21, wherein the DC-to-AC inverter means comprise an H-bridge inverter that produces a quasi-sine wave AC output signal, each period of the AC output signal including a positive pulse and a negative pulse, the duration of each of these pulses being fixed at about one-third of the period of the AC output signal to minimize a harmonic distortion of the AC output signal.

25. The DC-to-AC converter of claim 21, wherein the control means comprise a pulse width modulator that produces a variable width pulse for input to the DC-to-DC converter means to control the level of the intermediate DC voltage signal, in response to the current signal and the error signal.

26. The DC-to-AC converter of claim 21, wherein the DC-to-DC converter means, the capacitor, and the control means comprise a power module, the DC-to-AC converter comprising a plurality of such power modules connected in parallel to the DC-to-AC inverter means, each power module supplying a portion of the power required by the load.

27. The DC-to-AC converter of claim 26, further comprising central processing means for synchronizing the plurality of power modules and for generating switching signals to control the frequency of the AC output signal produced by the DC-to-AC inverter means, the central processing means including means for detecting faults in the operation of the DC-to-AC converter, causing it to shut down if a fault is detected.

28. The DC-to-AC converter of claim 24, wherein the H-bridge inverter includes a plurality of electronic switches that conduct current in a predetermined sequence to generate the pulses in the AC output signal, at least two of the electronic switches being made conductive between the pulses of the AC output current to convey inductive or reactive current developed at the load.

29. The DC-to-AC converter of claim 21, wherein the DC-to-AC converter means comprise a DC-to-AC voltage boost circuit that increases the intermediate DC voltage signal supplied by the source of DC to equal the predetermined DC voltage.

30. The DC-to-AC converter of claim 21, wherein the DC-to-AC converter means comprise a DC-to-DC voltage feedback circuit that varies the intermediate DC voltage signal supplied by the DC-to-DC converter means to equal the predetermined DC voltage.

31. A method for converting DC to AC and regulating the voltage level of an AC signal supplied to a variable load, comprising the steps of:
 a. variably controlling power supplied from a DC source to obtain an intermediate DC voltage signal;
 b. storing energy in a capacitor substantially at a predetermined DC voltage level;
 c. inverting the intermediate DC voltage signal, producing an AC output signal;
 d. monitoring a DC supplied to charge the capacitor, producing a current signal indicative of a magnitude of that DC;
 e. monitoring the intermediate DC voltage signal across the capacitor to produce an error signal indicative of the difference between that voltage and the predetermined DC voltage level;
 f. integrating the error signal selectively using either a short time constant or a long time constant producing an integrated error signal, the long time constant being used unless the intermediate DC voltage signal across the capacitor is less than a predetermined minimum; and
 g. controlling the power supplied by the DC source in response to the current signal and the integrated error signal, thereby indirectly regulating the AC output.

32. The method of claim 31, wherein the step of variably controlling the power supplied from the DC source comprises the steps of converting a DC power signal from the DC source to a high frequency AC signal, transforming the high frequency AC signal to an AC voltage, and rectifying the AC voltage to a DC voltage that can differ from that of the DC source.

33. The method of claim 32, wherein a pulse width of the high frequency AC signal is controlled in response to the current signal and the integrated error signal to control the power supplied by the DC source.

* * * * *